UNITED STATES PATENT OFFICE 2,559,325

PROCESS FOR THE CONVERSION TO SULFUR AND/OR SULFUR DIOXIDE OF OTHER SULFUR COMPOUNDS AND CATALYSTS THEREFOR

Paul Xavier Spillane, Abbotsford, near Sydney, New South Wales, Australia, assignor to Keith Williams, Sydney, New South Wales, Australia No Drawing. Application July 21, 1949, Serial No. 106,096. In Australia May 31, 1946

8 Claims. (Cl. 23—177)

This application is a continuation-in-part of my application Serial No. 743,188 filed April 22, 1947, now abandoned.

This invention is directed to a process for catalytically oxidising hydrogen sulphide to elemental sulphur and/or sulphur dioxide, and to catalysts for use in such process. In some cases the catalysts can also be used to effect catalytic oxidation of carbon oxysulphide and carbon disulphide and other organic sulphur compounds to sulphur and/or sulphur dioxide.

According to the invention which is the subject of applicant's prior application No. 60,378 gaseous sulphides, including hydrogen sulphide, can be catalytically oxidised to elemental sulphur, or mixtures of elemental sulphur and sulphur dioxide by passing the gaseous sulphides together with oxygen, carbon monoxide, or carbon dioxide over a new iron catalyst. The iron catalyst of that invention is prepared from a mixture of alkali carbonate and iron oxide by first reducing the iron oxide to catalytically active metallic iron and then passing a gaseous sulphide thereover until the alkali and iron are completely converted to sulphide and become capable of carrying out the process. It is essential to that invention that the iron oxide be first reduced to the catalytically active metallic iron.

I have now discovered that hydrogen sulphide can be catalytically oxidised to elemental sulphur, or mixtures of elemental sulphur and sulphur dioxide, by catalysts consisting of mixtures of an alkali sulphide and sulphides of metals selected from the group consisting of nickel, cobalt, manganese, tin and aluminum, the said sulphides being prepared in situ upon a catalyst carrier by the action of a mixture of hydrogen and hydrogen sulphide upon mixtures of alkali compounds and reducible compounds of the said metals.

Accordingly, this invention is directed to a catalytic oxidation process for converting hydrogen sulphide to sulphur or mixtures of sulphur and sulphur dioxide comprising contacting hydrogen sulphide and a gas selected from the group consisting of oxygen and/or oxides of carbon at a temperature from 80° C. to 400° C. with a catalyst composed of an alkali sulphide and a sulphide of a metal selected from the group consisting of nickel, cobalt, manganese, tin and aluminium in which the proportion of alkali sulphide is from 5% to 66% of the metal sulphide, said catalyst having been formed by passing a mixture of hydrogen sulphide and hydrogen over an intimate admixture upon a catalyst carrier of an alkali compound and a reducible compound of the selected metal.

The oxygen required for the process may be supplied as such, or in the combined form as carbon monoxide or carbon dioxide.

The catalyst contains as its active constituents alkali sulphides and sulphides of at least one metal selected from the group consisting of nickel, cobalt, manganese, tin and aluminum. The physical form of the catalyst, and the manner in which the metal sulphide is formed, are both important. The alkali sulphides and the metal sulphides must be in intimate admixture, and the mixture must be distributed over a catalyst carrier to provide an efficient catalyst. The catalytically active metal sulphide must be produced along with the alkali sulphide by reducing a metal compound in the presence of hydrogen sulphide, whereby a double reaction occurs in which the desired sulphide is produced. The reducing gas and the hydrogen sulphide are contacted with the partially prepared catalyst at a temperature in the region of 240° C. until all the alkali and metal are converted to the sulphide. The procedure outlined is necessary to prevent the formation of forms of the metal sulphide inactive in the present process.

Several different methods can be employed to prepare the catalyst. In all methods, however, an intimate admixture of one or more alkali compounds (preferably as the carbonate, bicarbonate, sulphite or sulphide) and one or more reducible compounds of the metals enumerated above is formed on a catalyst carrier. This intimate admixture may be obtained by dry mixing and grinding the alkali compound or compounds, metal compound or compounds, and inert catalyst carrier together to a fine powder, and subsequently mixing to a paste with a solvent, such as water, for the alkali compound. This method is particularly applicable when starting with manganese dioxide, nickel oxide and cobalt oxide.

An alternative method is to melt the metal compound and thoroughly stir the catalyst carrier into it to give a stiff paste. The paste may be heated to decompose the metal compound to the oxide in those cases where heating will cause such decomposition, as in the case of manganic nitrate. Alternatively, the paste may be allowed to cool. The resultant paste is then immersed in a strong solution of the alkali compound, preferably until saturated, then dried and/or baked, and granulated into pellets.

Another method of obtaining the desired intimate admixture is to employ water-soluble salts of the metal or metals. The catalyst carrier, preferably in pellet form, is immersed in the metal compound solution until saturated, then dried, for example at a temperature between 110° C. and 200° C., then immersed in an alkali salt solution, and dried again.

The catalyst may be converted to pellet form, for use in a catalyst chamber, at any suitable stage of the preparation.

Having formed the intimate admixture of an alkali compound and a reducible compound of a metal from the selected group upon the carrier the partly prepared catalyst, in pellet or other suitable form, is packed into a chamber, and a mixture of a reducing gas and hydrogen sulphide is passed into contact therewith. At first substantially all the hydrogen sulphide is removed from the gas with the conversion of the alkali and metal compounds to the sulphides. After a time the partly prepared catalyst reaches a stage where it will no longer remove the hydrogen sulphide from the gas and hydrogen sulphide appears in the effluent gases from the chamber. The passage of the hydrogen-sulphide-reducing gas mixture over the partly prepared catalyst is continued for a further period of up to two hours. If the reducing gas is carbon monoxide or water gas, then it will be found that the hydrogen sulphide gradually disappears from the effluent gas, and elemental sulphur, or elemental sulphur and sulphur dioxide, appear. The catalyst is now ready for use in the process of this invention.

In carrying out the process of this invention hydrogen sulphide is mixed with oxygen, carbon monoxide or carbon dioxide, and the mixture passed into contact with the catalyst prepared as above at a temperature above 80° C. If the process is carried out at below 260° C., and the catalyst has never, at any time, exceeded that temperature, then the hydrogen sulphide is converted to elemental sulphur. If the process is carried out at above 260° C., or if the catalyst has at some time exceeded that temperature, then some of the hydrogen sulphide will be converted to sulphur dioxide, and both elemental sulphur and sulphur dioxide will be obtained.

Catalysts containing nickel, cobalt or tin sulphide are capable of oxidising carbon disulphide and carbon oxysulphide, as well as hydrogen sulphide, to sulphur or mixtures of sulphur and sulphur dioxide. Carbon disulphide and carbon oxysulphide may also replace hydrogen sulphide in the preparation of catalysts in which the selected metal is nickel, cobalt or tin.

The catalyst may include more than one alkali sulphide, and may include sulphides of more than one metal.

If the process of this invention is carried out under oxidising conditions the alkali sulphide in the catalyst is rapidly converted to alkali sulphite, but the process remains effective despite the change.

Examples of suitable catalyst carriers are diatomaceous earth, kieselguhr, pumice, activated charcoal and silica gels.

Cyanide compounds, tar fog or heavy petroleum fog, if present in the sulphur-containing materials to be treated, must be removed before subjecting the materials to the process of this invention. It is believed that the cyanide compounds, if not removed, are taken up by the alkali sulphide in the catalyst. Whatever the reaction, the cyanide compounds or the fogs adversely affect the efficiency of the catalyst, and should be removed beforehand.

A more detailed description of the preparation of the catalyst of this invention will now be given with the aid of examples.

*Example 1*

A catalyst carrier such as kieselguhr in pellet form is immersed in a 50% solution in water of nickel sulphate ($Ni_2SO_4$) until saturated. The pellets are then dried by heat at about 110°–200° C., are immersed in a solution of alkali carbonate of approximately 16% solution until saturated, and the pellets again dried by heat. The pellets are loaded into a catalyst chamber and a gaseous mixture comprising hydrogen sulphide and hydrogen is passed into contact therewith at approximately 240° C. until the hydrogen sulphide is no longer taken up and appears in the affluent gases and for two hours thereafter.

The catalyst so obtained comprises an intimate mixture of nickel sulphide ($Ni_2S_3$) and alkali sulphide. The alkali sulphide may be converted to alkali sulphite if oxygen is present in the gases subsequently treated by this catalyst.

The gaseous mixture employed in preparing the catalyst may include carbon disulphide, or carbon oxysulphide in place of, or together with, the hydrogen sulphide, whilst the hydrogen may be replaced by carbon monoxide or any commercial reducing gas such as water gas. If the reducing gas contains carbon monoxide completion of the catalyst preparation is indicated by the appearance of sulphur in the effluent gases.

*Example 2*

The method disclosed in Example 1 is carried out with cobalt sulphate ($Co_2SO_4$) in place of the nickel sulphate.

*Example 3*

Two parts of manganic nitrate by weight are melted and mixed with sufficient kieselguhr or other inert catalyst carrier to give a stiff paste. The paste is heated to convert the manganic nitrate to the oxide, immersed in a strong solution of alkali carbonate, removed from the solution, baked at about 300° C., and then granulated to pellets of the required size. The pellets are charged into a catalyst chamber and treated with a gaseous mixture containing hydrogen sulphide and a reducing gas as in Example 1. The hydrogen sulphide cannot be replaced by carbon disulphide or carbon oxysulphide.

*Example 4*

The method of preparation of Example 1 is carried out employing alkali sulphite in place of alkali carbonate.

*Example 5*

The method of preparation of Example 1 is carried out employing alkali sulphide in place of alkali carbonate.

*Example 6*

The method of preparation of Example 1 is carried out employing manganic sulphate or manganic nitrate in place of nickel sulphate.

*Example 7*

The method of preparation of Example 1 is carried out employing stannic sulphate in place of nickel sulphate.

*Example 8*

The method of preparation of Example 1 is carried out employing aluminium sulphate in place of nickel sulphate.

*Example 9*

Ordinary town gas containing 250 grains hydrogen sulphide per 100 cubic feet and 20 grains of organic sulphur compounds (consisting of carbon disulphide, thiophene, carbon oxysulphide and mercaptans) are passed into contact with a catalyst prepared in accordance with Example 1 at a space velocity of approximately 500 and at a temperature of 240°–260° C. The exit gases contain elemental sulphur, mercaptans, and thiophene. The whole of the hydrogen sulphide, the carbon disulphide and the carbon oxysulphide is converted to the elemental sulphur.

The catalyst used in this example can be replaced by either of those prepared as described in Examples 2 and 7.

*Example 10*

Coke oven gas containing 200 grains of hydrogen sulphide and 6 grains of organic sulphur compounds per 100 cubic feet is treated for the production of elemental sulphur. The organic sulphur content is regarded as unimportant in this gaseous mixture. A manganese catalyst prepared in accordance with Example 3 is used and the gas passed into contact therewith at a space velocity of 500 and at a temperature of 260° C. The exit gases contain elemental sulphur, 6 grains per 100 cubic feet organic sulphur compounds and 4 grains of hydrogen sulphide per 100 cubic feet of exit gas. This represents a 98% conversion of the original hydrogen sulphide to elemental sulphur.

The catalyst used in the above example may be replaced by any of the catalysts prepared as described in Examples 3, 4, 5, 6 or 8.

Having thus disclosed the invention, what is claimed is:

1. A catalytic oxidation process for converting gaseous sulphide to sulphur or mixtures of sulphur and sulphur dioxide, which comprises contacting the gaseous sulphide and a gas selected from the group consisting of oxygen and oxides of carbon at a temperature between 80° C. and 400° C. with a catalyst comprising an alkali sulphide and a sulphide of a metal selected from the group consisting of nickel, cobalt, manganese, tin and aluminium in which the proportion of alkali sulphide is from 5% to 66% of the metal sulphide, said catalyst having been formed by passing a mixture of the gaseous sulphide and a reducing gas selected from the group consisting of hydrogen, carbon monoxide and water gas over an intimate mixture upon a catalyst carrier of an oxide of the selected metal and a member selected from the group consisting of alkali carbonate, alkali bicarbonate, alkali sulfide and alkali sulfite, whereby in said oxidation process the gaseous sulphide is converted into elemental sulphur when the temperature of the oxidation process does not exceed 260° C. and the catalyst has at no time been heated to a temperature exceeding 260° C., and is converted into a mixture of sulphur and sulphur dioxide when the temperature of the oxidation process exceeds 260° C. and when the catalyst has at any time been heated to a temperature exceeding 260° C.

2. A process according to claim 1, wherein the gaseous sulphide is selected from the group consisting of hydrogen sulphide, carbon disulphide and carbon oxysulphide, and the metal sulphide is nickel sulphide.

3. A process according to claim 1, wherein the gaseous sulphide is selected from the group consisting of hydrogen sulphide, carbon disulphide and carbon oxysulphide, and the metal sulphide is cobalt sulphide.

4. A process according to claim 1, wherein the gaseous sulphide is selected from the group consisting of hydrogen sulphide, carbon disulphide and carbon oxysulphide, and the metal sulphide is tin sulphide.

5. A process according to claim 1, wherein the gaseous sulphide is hydrogen sulphide and the metal sulphide is manganese sulphide.

6. A process according to claim 1, wherein the gaseous sulphide is hydrogen sulphide and the metal sulphide is aluminium sulphide.

7. A catalytic oxidation process for converting gaseous sulphide to sulphur, which comprises contacting the gaseous sulphide and a gas selected from the group consisting of oxygen and oxides of carbon at a temperature between 80° C. and 260° C. with a catalyst comprising an alkali sulphide and a sulphide of a metal selected from the group consisting of nickel, cobalt, manganese, tin and aluminium in which the proportion of alkali sulphide is from 5% to 66% of the metal sulphide, said catalyst having been formed by passing a mixture of the gaseous sulphide and a reducing gas selected from the group consisting of hydrogen, carbon monoxide and water gas over an intimate mixture upon a catalyst carrier of an oxide of the selected metal and a member selected from the group consisting of alkali carbonate, alkali bicarbonate, alkali sulfide and alkali sulfite at a temperature of about 240° C.

8. A catalyst comprising an alkali sulphide and a sulphide of a metal selected from the group consisting of nickel, cobalt, manganese, tin and aluminium in intimate admixture upon a catalyst carrier and in which the proportion of alkali sulphide is from 5% to 66% of the metal sulphide, said catalyst having been formed by passing a mixture of gaseous sulphide and a reducing gas selected from the group consisting of hydrogen, carbon monoxide and water gas over an intimate admixture upon the said carrier of an oxide of the selected metal and a member selected from the group consisting of alkali carbonate, alkali bicarbonate, alkali sulphide and alkali sulphite, said catalyst being an active agent at a temperature between 80° C. and 400° C. for the catalytic oxidation of gaseous sulphides to elemental sulphur when the catalyst is at no time heated to a temperature exceeding 260° C. and to a mixture of sulphur and sulphur dioxide when the catalyst is at any time heated to a temperature exceeding 260° C.

PAUL XAVIER SPILLANE.

REFERENCES CITED

The following references are of record in the file of this patent:

UNITED STATES PATENTS

| Number | Name | Date |
|---|---|---|
| 2,316,201 | Wallden et al. | Apr. 13, 1943 |
| 2,402,684 | Signaigo | June 25, 1946 |